Oct. 8, 1946.  A. W. MILLER  2,408,801
"C" CLAMP
Filed July 7, 1943
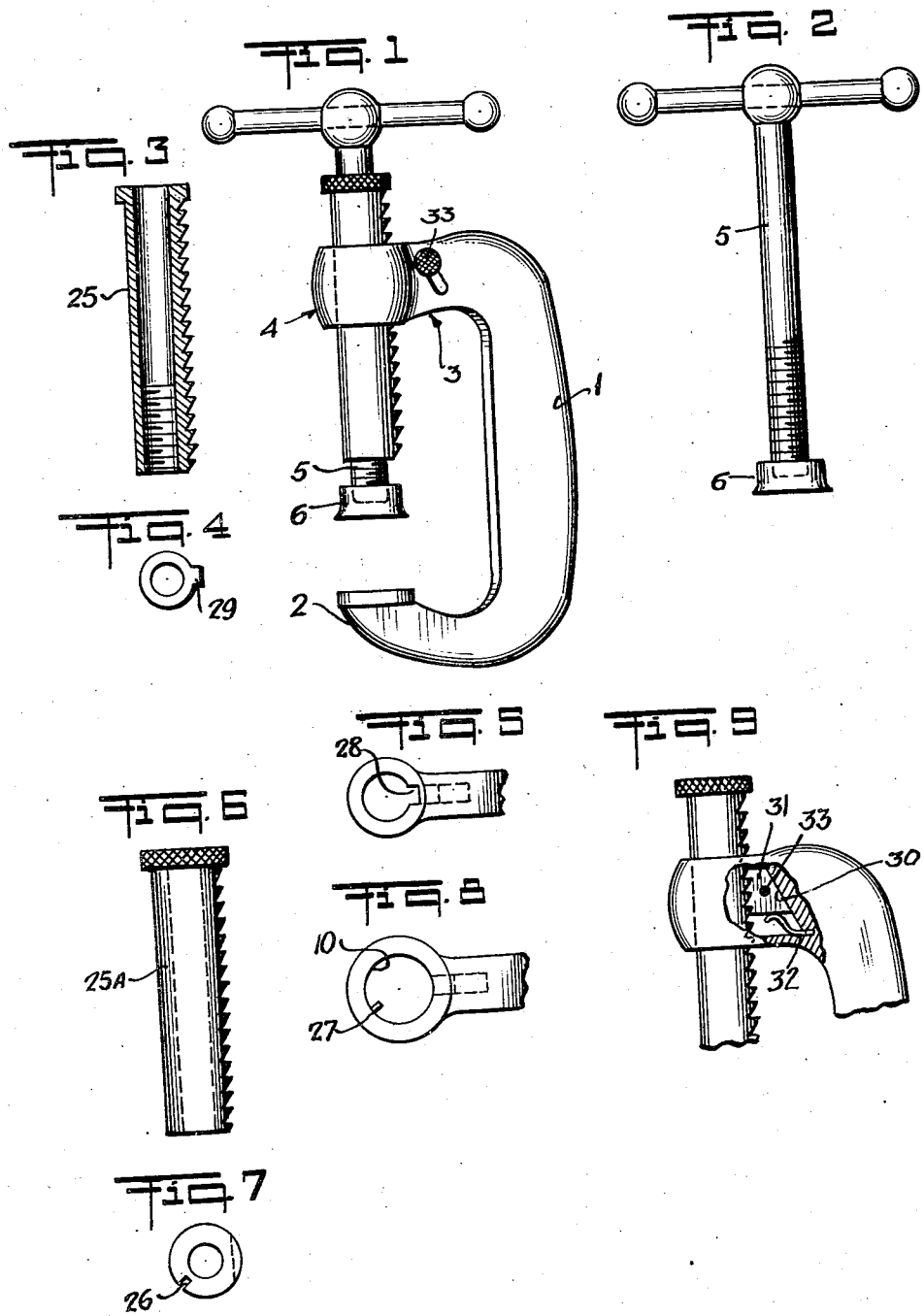
INVENTOR.
Albert W. Miller
BY Howard T. Jeanson
ATTORNEY.

Patented Oct. 8, 1946

2,408,801

UNITED STATES PATENT OFFICE 2,408,801

"C" CLAMP

Albert W. Miller, Jamaica, N. Y.

Application July 7, 1943, Serial No. 493,695

2 Claims. (Cl. 144—305)

The present invention pertains to clamp devices and has for its object to provide a quick adjusting precision clamp.

Clamps of this type include a C-shaped frame the lower end portion of which constitutes the jaw of the clamp. In the upper end portion of the frame is mounted a movable member adapted to move toward or away from the jaw, so that a work piece can be secured between the jaw and the adjacent end of the movable member by forcing the latter against the former.

It is well known to provide a threaded bore in the upper portion of the frame and to mount therein a suitably threaded movable member which can be screwed, by simple rotation, against the jaw or removed therefrom. These devices are inconvenient if work pieces of varying thicknesses or with flanged surfaces are to be held because the preliminary adjustment to a position approximately corresponding to the thickness of the work piece requires an excessive number of revolutions of the threaded member.

In order to simplify the preliminary adjustment to pass the clamp over flanged or angled surfaces and to approximately fit work pieces of varying dimensions, it has already been suggested that a sleeve be interposed between the frame and the movable member. This sleeve is slidable in the frame and threaded in its interior so that an exteriorly threaded movable element can be screwed up and down therein. With this structure the preliminary adjustment is quick, since it requires only the sliding of the sleeve in the frame. Once the position of the clamp corresponds approximately to the thickness of the work piece, the sleeve is locked with respect to the frame and, then, a few rotations of the movable member in the sleeve will suffice to firmly secure the work piece.

The known clamps including a sleeve, while convenient as far as the preliminary adjustment is concerned, are unsatisfactory because the locking means for holding the sleeve does not efficiently prevent a rotary movement thereof and exposes the sleeve and locking means to excessive lateral and torsional stresses. Accordingly, the setting of such a clamp is wanting in accuracy and this deficiency is progressively aggravated due to rapidly increasing wear.

It is an object of the present invention to overcome these shortcomings and to devise a precision clamp free from any appreciable lateral or torsional stresses.

To that end, it is a feature of the present invention that the exterior wall of the sleeve is provided with toothed serrations, while a correspondingly serrated angularly-shaped auxiliary fastening member is associated with an angularly-shaped cavity in the frame of the clamp. The auxiliary element is adapted, in one position, to engage the serrations on the sleeve and to lock the same, so as to prevent movement in an upward direction, and, in a second position, to disengage the said serrations so as to permit a sliding movement of the sleeve (in either direction).

Further features of the present invention will become apparent from the following description of embodiments thereof which are illustrated in the accompanying drawing:

Fig. 1 is an elevation of a clamp according to the present invention;

Figs. 2 to 9 show, partly in cross section, the details of the clamp according to Fig. 2.

The end portion 2 of frame 1 is formed as a jaw or the like to be applied against one side of a work piece. The opposite end portion 3 is formed with an annular head piece 4 adapted to receive movable clamping means, including a clamping screw (stem) 5 and a swivel head 6 to engage the other side of a work piece.

There is also provided in portion 3 of frame 1 a cavity 30 (Fig. 9) with an angularly-shaped bearing surface for receiving angularly-shaped ratchet pawl 31. Cavity 30 is so formed as to permit angular pawl 31 to have a longitudinal and lateral movement. A resilient means, such as any type of spring 32 may be used to hold pawl 31 in the upper part of the conforming angular recess 30 and in contact with the ratchet teeth of sleeve 25 or 25A. Clamps may, however, be made without such resilient means to actuate the pawl, and in applying such clamps to a work piece when end portion 2 of frame 1 is in a downward position pawl 31 may be engaged with the sleeve by manually sliding the pawl against the sleeve by means of the knurled thumb buttons 33. When such clamps are applied to a work piece with portion 2 of frame 1 in an upward position, the preferred position for clamping pieces to be welded, gravity will cause pawl 31 to engage the teeth of the sleeve.

In the clamp according to Figs. 1 to 9 there is provided a sleeve 25 or 25a through which clamping screw 5 operates. Two types of sleeves are shown, one with ratchet notches cut in a longitudinal tongue as in Fig. 3, the other with the ratchet notches cut into the surface of a heavier and stronger sleeve of somewhat larger diameter as in Fig. 6. The latter sleeve has a longitudinal groove 26 (Fig. 7) to cooperate with a tongue 27

(Fig. 8), provided in bore 10 in frame head 4. Except for this groove and the ratchet notches, the outer surface of this sleeve is smooth and is designed to fit snugly in bore 10 which, of course, conforms to the shape of sleeve 25A. When bore 10 is to receive a sleeve with a protruding tongue 29, as in Figs. 3 and 6, it is provided with a suitable groove 28 to admit tongue 29 and, when used with the circular type of sleeve as in Fig. 6, it is provided with a suitable tongue 27 for engaging in groove 26. Bore 10 may, of course, be shaped to receive a sleeve with a hexagonal or other non-cylindrical outer surface.

Sleeves 25 and 25a are internally threaded over a short distance from the end to cooperate with the external threads of clamping screw 5. The sleeves and the clamping screw 5 may, of course, be threaded throughout their length, if desired. Tongues 27, 29 and grooves 26, 28, respectively, prevent the sleeves from turning and insure the ratchet notches or toothed serrations always being square with mating notches or toothed serrations in the face of the angularly-shaped auxiliary fastening member or ratchet pawl.

A light pressure on the sleeve or its accompanying screw member 5 will cause pawl 31 to compress spring 32 and permit it to move down and back, thus disengaging the ratchet-teeth of the pawl and sleeve and permitting the free downward movement of the sleeve until swivel head 6 comes into contact with the material to be held, after which the ratchet teeth of pawl 31 automatically reengages the ratchet-teeth of the sleeve 25 or 25A, and prevents upward movement thereof. Threaded clamping screw 5 is then turned to provide the required clamping force. It is evident that, as the clamping force is applied, pawl 31, because of its angular bearing surface co-acting with the angular bearing surface of frame cavity 30 into which it is fitted, will be wedged with increasing tightness against the ratchet-teeth of sleeve 25 or 25A.

The clamp may be released by backing off clamping screw 5, usually only a turn or two is required, until the clamping force is released. Pawl 31 is then disconnected by pressing down the knurled thumb button 33 the stem of which operates in a slot of the same angle as the angular bearing surfaces of recess 30 and of pawl 31. This disengages the ratchet and permits the sleeve 25 to be raised.

The jaw portion 2 of clamp frame 1 and swivel head 6 of clamping screw 5 are formed so that slip-on jaws may be attached for holding pipes, rods, etc.

The foregoing description is not intended to limit the present invention which extends to all changes, modifications and equivalents comprehended within the scope of the appended claims.

What is claimed is:

1. A clamp including a C-shaped frame, a jaw formed in one end portion of said frame, a bore in the opposite end portion of said frame adapted to receive movable clamping means, said means including a sleeve slidable in said bore and a clamping screw traversing said sleeve and secured to the same by means of screw threads, the exterior wall of said sleeve being provided with a plurality of toothed serrations, a wedge-shaped cavity in said opposite end of said frame, a pawl, having a plurality of toothed serrations, which is similar in shape to said cavity but of smaller dimensions, mounted within the same so as to remain free for axial and lateral movement with respect to said sleeve, a resilient means urging said pawl into engagement with said sleeve, said pawl being adapted to permit axial displacement of said sleeve toward said jaw and to oppose a displacement in the opposite direction, and being further adapted to be firmly wedged between said sleeve and the tapered wall of said cavity when a force is tending to push said sleeve away from said jaw whereby a proportional part of the force acting on said sleeve in the axial direction is translated into a radial component causing said pawl to engage said toothed serrations the more firmly the higher the value of said force, while simultaneously forcing said sleeve against the wall of said bore, and means operable from the outside to release said pawl to permit axial displacement of said sleeve away from said jaw when said sleeve is free of a clamping force.

2. A clamp including a C-shaped frame, a jaw formed in one end portion of said frame, a bore formed in the opposite end portion of said frame, a cavity adjacent said bore and opening toward the axis of the bore, said cavity having a wall inclined towards the axis of said bore and toward said opposite end portion of the frame, said bore and said cavity being adapted to receive a movable clamping means and a movable auxiliary fastening member respectively, said auxiliary fastening member being smaller than said cavity and having a bearing surface inclined in the same direction as said wall in said cavity, said clamping means including a sleeve slidable in said bore and a clamping screw traversing said sleeve and secured thereto by means of screw threads, the exterior wall of said sleeve being provided with a plurality of toothed serrations, said auxiliary fastening member, having one or more corresponding toothed serrations, being slidable within said cavity and being adapted to slide axially and laterally away from said sleeve, from one position, to afford free passage of said sleeve toward said jaw, and to slide axially and laterally into engagement with said sleeve, from another position, to prevent axial movement of said clamping means away from said jaw.

ALBERT W. MILLER.